United States Patent [19]
Jensen et al.

[11] Patent Number: 4,545,259
[45] Date of Patent: Oct. 8, 1985

[54] ULTRASONIC MEASURING APPARATUS

[75] Inventors: Hans-Erik K. Jensen, Åbenrå; Niels Abildgaard, Nordborg; Steen H. Nielsen, Sǿnderborg, all of Denmark

[73] Assignee: Danfoss A/S, Nordborg, Denmark

[21] Appl. No.: 538,203

[22] Filed: Oct. 3, 1983

[30] Foreign Application Priority Data

Oct. 27, 1982 [DE] Fed. Rep. of Germany ....... 3239770

[51] Int. Cl.⁴ .............................................. G01F 1/66
[52] U.S. Cl. ................................................ 73/861.28
[58] Field of Search ............ 73/861.27, 861.28, 861.31

[56] References Cited

U.S. PATENT DOCUMENTS

| | | | |
|---|---|---|---|
| 3,751,979 | 8/1973 | Ims | 73/861.27 |
| 4,104,915 | 8/1978 | Husse | 73/861.28 |
| 4,144,752 | 3/1979 | Lolk | 73/861.28 |
| 4,365,518 | 12/1982 | Zacharias, Jr. | 73/861.28 |

*Primary Examiner*—Herbert Goldstein
*Attorney, Agent, or Firm*—Wayne B. Easton

[57] ABSTRACT

The invention relates to an ultrasonic measuring apparatus of the type having a measuring path which extends in a tube between two ultrasonic converters. More accurate measuring results are obtained by providing axially spaced inserts in the measuring tube for changing the velocity profile of the medium flowing through the tube so that the average of the upstream and downstream signals is substantially proportional to the mean flow velocity of the medium flowing through the tube.

13 Claims, 7 Drawing Figures

ULTRASONIC MEASURING APPARATUS

The invention relates to an ultrasonic measuring apparatus comprising a measuring path which extends between two ultrasonic converters and leads axially through a measuring tube.

In a known ultrasonic measuring apparatus of this kind (DE-AS 29 24 561), a straight measuring tube is disposed between two ultrasonic converters which are used alternately as transmitter and receiver. By measuring the duration of the ultrasonic pulses, one can derive the mean flow velocity of the medium flowing through and thus the mean quantity per unit time. It has, however, been found that within the operating range the measured results can depart considerably from the actual conditions. In particular, for low Reynold numbers, i.e. high viscosity and low velocity and thus small flow quantities, the measured values can depart as much as 20% from the true value if the measuring apparatus was set for the range of high Reynold numbers.

The invention is based on the problem of providing an ultrasonic measuring apparatus of the aforementioned kind which gives more accurate measuring results over the entire measuring range.

This problem is solved according to the invention in that at least two axially spaced inserts in the measuring tube so influence the velocity profile of the through-flowing medium and/or so define the path of the effective ultrasonic signal that in the predominant part of the working range the flow velocity averaged over the path of the ultrasonic signal is substantially dependent only on the velocity averaged over the cross-section of the tube.

The invention is based on the consideration that a profile of the axial velocity of the flowing medium is formed in a measuring tube, which profile has a maximum at the tube axis and a minimum at the internal face of the tube. The conditions of maximum and minimum change with the Reynold number. Consequently, the velocity of the ultrasonic signal depends not only on the mean velocity of the flowing medium but also on the shape of the velocity profile. In contrast, if one provides inserts in the measuring tube in accordance with the invention, one can influence the velocity profile in a correcting sense. For example, the velocity profile of the flowing medium can be deformed in sections so that a maximum and an intermediate minimum follow each other axially so that the ultrasonic signal which passes the sections successively indicates an averaged flow velocity no longer having a marked maximum.

With particular advantage, the inserts comprise a blocking face at least near the medial axis of the measuring tube. This blocking face reduces the flow velocity at the medial axis. The velocity maximum normally formed at the tube axis is reduced correspondingly. The larger the maximum, the stronger will be the reduction.

It is advisable for blocking face sections to be interspersed with free flow sections of which the dimensions increase with increasing radius. In this way, the velocity profile is influenced most strongly at the middle and less towards the outside. The velocity profile is therefore made much more uniform over the cross-section.

A very simple embodiment is obtained if the inserts comprise blocking face sections in the form of a plurality of preferably uniformly angularly offset arms. The width of the arms can be constant or decrease radially outwardly. These arms suffice to produce the desired blocking effect but leave an adequate cross-section free for flow.

It is particularly favourable if four arms are provided offset by 90°. This is adequate to produce the desired measuring accuracy, it being preferable to provide a plurality, e.g. six or seven, of such inserts behind each other. Since the free cross-sections are comparatively large, damping of the ultrasonic signals and the sensitivity to impurities is low. If more arms are used, e.g. eight or ten, a fewer number of inserts will suffice but at the expense of somewhat more damping and sensitivity to impurities.

It is also possible for the inserts to comprise at least one concentric ring as the blocking face section. A ring at the periphery can ensure that ultrasonic waves directly adjacent the wall of the tube will not be part of the effective measuring signal. Several concentric rings will leave outwardly increasing annular sections free between each other.

It is preferable for the wall thickness of the inserts to be very small in relation to the length of the measuring path. This ensures that ultrasonic waves transmitted through the inserts and therefore more rapidly than through the flowing medium will not have a marked influence on the measuring result.

Another advantage is obtained if the inserts have curved surfaces. The reflected ultrasonic waves are then not bounced to and fro axially but directed outwardly so that they will not reach the receiver or only to a strongly reduced extent.

It is advisable for the internal face of the measuring tube to be covered with sound damping material. Ultrasonic waves striking the internal surface will therefore be absorbed. This applies particularly to those ultrasonic waves which were reflected from the curved surface of the inserts.

It is also favourable to make the internal surface of the measuring tube rough, particularly with a mean roughness of $40\mu$. This will create a turbulent flow even at a low flow velocity, which remains effective up to the central portion of the flow profile and supports the effect of the inserts.

In a further construction, each insert is spaced from the preceding insert by a distance no more than equal to the developed length of the velocity profile. The maximum produced by the insert is compensated by the form of the velocity profile obtaining behind the insert so that, as viewed in the axial direction, a uniform mean value of the velocity of the flowing medium occurs.

Preferred examples of the invention will now be described in more detail with reference to the drawing, wherein.

Figure 1:
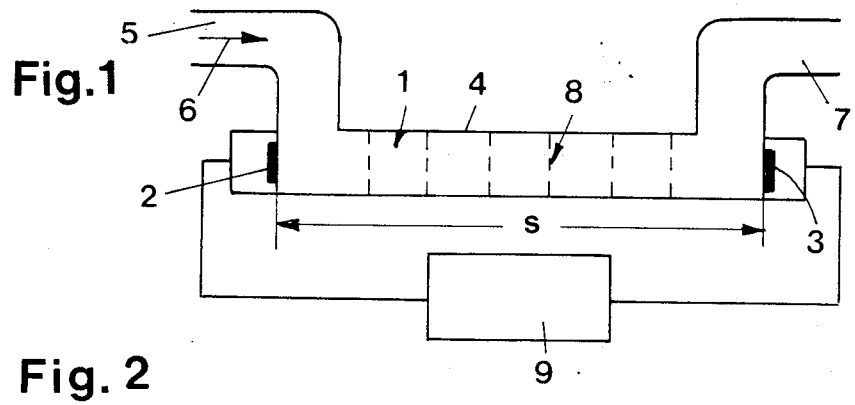
FIG. 1 is a diagrammatic representation of an ultrasonic measuring apparatus according to the invention.

FIG. 1 shows a measuring path 1 of length s which extends between a first ultrasonic converter 2 and a second ultrasonic converter 3 through a measuring tube 4. Through a supply connector 5, a flowing medium is introduced in the direction of the arrow 6 and, after flowing through the measuring path 1, led away through an outlet connection 7. The measuring tube 4 contains built-in inserts 8 to be described in more detail hereinafter. In operation, the ultrasonic converters 2 and 3 are alternately used as transmitter and receiver.

An evaluating circuit 9 determines the duration of an ultrasonic signal over the measuring path 1 and, from this duration, the respective velocity of the ultrasonic signal.

It will be known that a downstream ultrasonic signal has a velocity $$V_{un} = C + V_M.$$

On the other hand, an ultrasonic signal going upstream has a velocity $$V_{uo} = C - V_M$$

wherein C is the sound velocity in the medium on standstill and $V_M$ the flow velocity of the medium averaged over the cross-section. By subtracting the two equations, one obtains $$V_M = \frac{V_{un} - V_{uo}}{2}$$

i.e. the mean flow velocity independently of the sound velocity.

If one assumes that the velocity profile for the flow is constant over the measuring path, there is proportionality between the volumetric flow Q and the mean velocity $V_M$. However, if the velocity profile for the flow is subjected to variations, whether because it has to be developed at the commencement of the measuring path or because it changes its shape depending on the Reynold number, i.e. with the amount of flow, which can be the case at Reynold numbers below 10,000, the measured result for the flow velocity and every quantity derived therefrom, such as the amount of flow, will depart considerably from the actual value in parts of the measuring range. This is compensated by the inserts 8.

Figure 2:
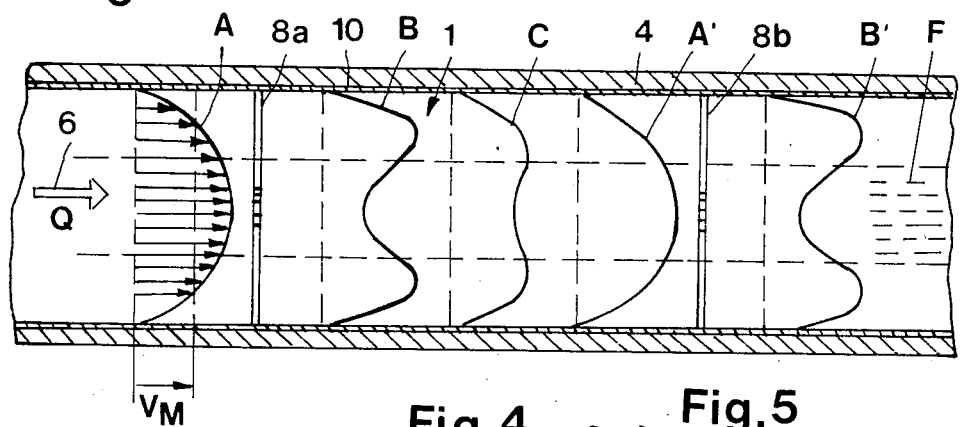
FIG. 2 is an enlarged longitudinal part-section through the measuring tube.
Figure 3:
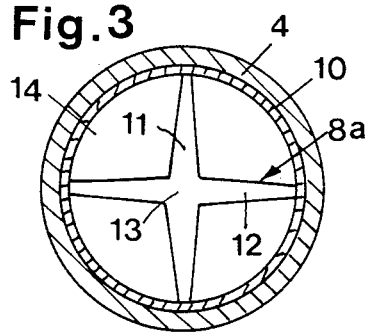
FIG. 3 is a cross-section through the FIG. 2 measuring tube.

FIG. 2 shows a section of the measuring tube 4 of which the internal surface 10 is rough or carries an internal damping covering 10 and has two inserts 8a and 8b. As is shown in FIG. 3, the inserts have the form of a star 11 with four arms 12 of which the width decreases radially outwardly. At the junction of the stars there is a blocking face section 13 near the axis of the tube. Between the arms there are free flow sections 14 with dimensions increasing radially outwardly.

When a quantity Q has flowed in the direction of the arrow 6 over a certain length in the measuring tube with a Reynold number under 10,000, the friction at the edge and the absence of turbulence produces a velocity profile A having its maximum near the tube axis. This corresponds to a velocity $V_M$ averaged over the tube cross-section. By reason of the insert 8a which represents a considerable obstacle near the tube axis, a velocity profile B is produced behind it with a radially outwardly displaced reduced maximum near the tube axis but an intermediate minimum. This velocity profile develops through a shape C back to a velocity profile A' corresponding to the profile A. By reason of the second insert 8b spaced from insert 8a by a distance that should be no more than equal to the developed length of this profile for laminar flow, a profile B' is again produced which corresponds to the profile B. The ultrasonic waves received by the receiver extend substantially through a limited cross-sectional region F and are therefore successively influenced by different velocities depending on the respective velocity profile. The flow velocity averaged in the axial direction is constant independently of the respective Reynold number because the maxima and minima compensate each other in the vicinity of the tube axis. Consequently, the shape of the velocity profiles in the measuring range no longer has a marked effect. In addition, the ultrasonic waves cannot pass through the central region by reason of the blocking face sections 13. The strongest variations occurring in the vicinity of the tube axis need therefore not be compensated because they are not included in an effective ultrasonic signal. The inserts also more rapidly suppress asymmetric profile developments such as are possible at the inlet to the measuring tube because of the perpendicular supply direction, thereby giving the symmetric conditions of FIG. 2 over most of the measuring tube. It is favourable if, as in FIGS. 1 and 2, the tube cross-section is larger than the end face of the converters 2 and 3. However, it is also possible to use a tube having a smaller cross-section than the converters.

Although the invention has been described with reference to a round tube, corresponding results can be achieved for tubes of different cross-section, e.g. rectangular.

Figure 4:
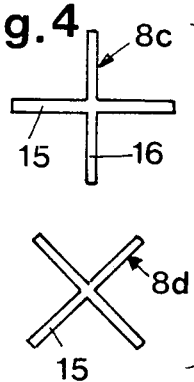
FIG. 4 is a modified form of inserts.
Figure 5:
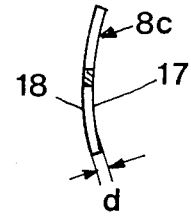
FIG. 5 is a cross-section through the insert of FIG. 4.

The inserts 8c and 8d in FIGS. 4 and 5 are crosses 15, each with four arms 16 of constant width. Successive inserts are mutually offset by 45°. In the axial projection, therefore, adequately large cross-sections remain free from a blocking face. Since the inserts 8c have a curved surface 17 or 18 at each side, ultrasonic waves striking the blocking face sections are reflected at an angle to the tube axis. They reach the damping cover 10 and are therefore harmless.

Figure 6:
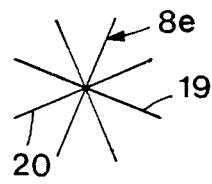
FIG. 6 is a further form of an insert.

In the FIG. 6 embodiment, an insert 8e has the shape of a star 19 with eight arms 20. This permits one to use a lower number of inserts in the measuring tube but results in somewhat more damping and greater sensitivity to impurities than in the previously described examples.

Figure 7:
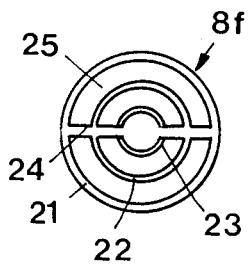
FIG. 7 is a still further form of insert.

FIG. 7 shows an insert 8f having blocking face sections in the form of three concentric rings 21, 22 and 23 interconnected by two radial arms 24. Free flow sections 25 are produced which have radial outwardly increasing dimensions.

In all examples, the wall thickness d of inserts 8 is very small in relation to the length s of the measuring path 1. A wall thickness d=0.5 to 1 mm is recommended.

Tests have shown that, within a large operating range covering Reynold numbers of 500 to 10,000, one can achieve a measurement which very accurately conforms to the actual value, departures of no more than 1 to 2% occurring for even very small Reynold numbers.

We claim:
1. An ultrasonic measuring apparatus, comprising, a measuring tube, two ultrasonic converters at opposite ends of said tube defining an ultrasonic signal measuring path therebetween, said converters being used alternately as transmitter and receiver to produce and receive upstream and downstream ultrasonic signals, at least two axially spaced inserts in said tube for changing the velocity profile of a medium flowing through said tube relative to said ultrasonic signal measuring path so that the average of said upstream and downstream ultrasonic signals is substantially proportional to the mean flow velocity of said medium flowing through said tube, said inserts having flow-through sections which are radially divergent relative to said measuring path, and said inserts each having an axially extending dimension represented as a thickness on the order of 0.5 mm to 1.0 mm.

2. An ultrasonic measuring apparatus according to claim 1 wherein each of said inserts has a blocking face at least in the vicinity of said measuring path.

3. An ultrasonic measuring apparatus according to claim 2 wherein said flow-through sections of each said insert are formed by spoke-like elements extending from said blocking face thereof.

4. An ultrasonic measuring apparatus according to claim 3 wherein said spoke-like elements have uniform cross sections extending radially thereof.

5. An ultrasonic measuring apparatus according to claim 3 wherein said spoke-like elements have tapered shapes with decreasing cross sections extending radially thereof.

6. An ultrasonic measuring apparatus according to claim 3 wherein each said insert has four of said spoke-like elements angularly displaced ninety degrees from each other.

7. An ultrasonic measuring apparatus according to claim 3 wherein said spoke-like elements of one said inserts are angularly displaced from said spoke-like elements of an adjacent one of said inserts so that said adjacent inserts are axially unaligned.

8. An ultrasonic measuring apparatus according to claim 2 wherein each said blocking face has the form of a ring axially aligned with said measuring path.

9. An ultrasonic measuring apparatus according to claim 1 wherein the wall thickness of each of said inserts in the axial direction is small compared to said length of said measuring path.

10. An ultrasonic measuring apparatus according to claim 9 wherein each of said inserts has a curved surface which is convex on the upstream side thereof.

11. An ultrasonic measuring apparatus according to claim 1 wherein the internal surface of said tube is covered with a sound dampening material.

12. An ultrasonic measuring apparatus according to claim 1 wherein the internal surface of said tube is rough textured.

13. An ultrasonic measuring apparatus according to claim 1 wherein each said insert is spaced from an adjacent one of said inserts a distance not greater than the developed length of said velocity profile.

* * * * *